United States Patent
Coleiny

(10) Patent No.: US 9,133,988 B2
(45) Date of Patent: Sep. 15, 2015

(54) LED-BASED LAMP INCLUDING SHAPED LIGHT GUIDE

(71) Applicant: Golshan Coleiny, Rockport, MA (US)

(72) Inventor: Golshan Coleiny, Rockport, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 181 days.

(21) Appl. No.: 13/888,781

(22) Filed: May 7, 2013

(65) Prior Publication Data

US 2014/0334179 A1 Nov. 13, 2014

(51) Int. Cl.
*F21K 99/00* (2010.01)
*F21V 8/00* (2006.01)

(52) U.S. Cl.
CPC .............. *F21K 9/52* (2013.01); *G02B 6/0096* (2013.01)

(58) Field of Classification Search
CPC .............................. G02B 19/0071; F21K 9/52
USPC .......................................................... 362/555
See application file for complete search history.

(56) References Cited

U.S. PATENT DOCUMENTS

| | | | |
|---|---|---|---|
| 6,679,621 B2 | 1/2004 | West et al. | |
| 6,803,607 B1 | 10/2004 | Chan et al. | |
| 7,111,972 B2 | 9/2006 | Coushaine et al. | |
| D599,491 S | 9/2009 | Luo | |
| 2002/0136027 A1* | 9/2002 | Hansler et al. | ................ 362/559 |
| 2004/0228131 A1 | 11/2004 | Minano et al. | |
| 2005/0225988 A1 | 10/2005 | Chaves et al. | |
| 2009/0129230 A1 | 5/2009 | Grotsch | |
| 2010/0097821 A1 | 4/2010 | Huang et al. | |
| 2010/0208456 A1* | 8/2010 | Huang | ........................... 362/231 |
| 2010/0208488 A1 | 8/2010 | Luo | |
| 2011/0089861 A1 | 4/2011 | Zeng et al. | |
| 2012/0126261 A1* | 5/2012 | Shimizu | ........................... 257/88 |
| 2012/0147611 A1 | 6/2012 | Huang et al. | |
| 2012/0320580 A1* | 12/2012 | Liang | ............................ 362/235 |

FOREIGN PATENT DOCUMENTS

WO 2010079436 A1 7/2010

* cited by examiner

*Primary Examiner* — Nimeshkumar Patel
*Assistant Examiner* — Jacob R Stern
(74) *Attorney, Agent, or Firm* — Edward S. Podszus

(57) ABSTRACT

A light guide (302) for a lamp includes a proximal end (510) configured to receive light from at least one LED. The received light forms an internal beam inside the light guide. The light guide angularly redistributes the LED light to have a specified angular output distribution. The light guide includes a distal end (520) having a peripheral portion (522). The light guide has a longitudinal axis (A) extending from the proximal end to the distal end. The light guide includes a lateral side (530) extending from the proximal end (510) to the peripheral portion (522) of the distal end (520). In a cross-section that includes the longitudinal axis, the lateral side of the light guide includes both a convex region and a concave region.

20 Claims, 16 Drawing Sheets

LED-BASED LAMP INCLUDING SHAPED LIGHT GUIDE

TECHNICAL FIELD

The present disclosure relates to lamps using at least one light emitting diode (LED) and a light guide.

BACKGROUND

In recent years, light-emitting-diodes (LEDs) have emerged as a new technology for illumination and lighting applications. LEDs have potential advantages over fluorescent lamps in that they may be more efficient, may produce less heat, may have longer lifetimes, and may function more efficiently at cold temperatures. For these reasons and others, there has been a recent effort to incorporate LEDs into lighting applications, such as retrofit chandelier or candelabra lamps.

An example of a known LED-based lamp is discussed in U.S. Patent Application Publication No. 2010/0208488 (Luo). FIG. 1 shows a known light bulb 1, which is discussed in Luo. The light bulb 1 has an envelope 5 that encompasses a light pipe 2, a base 4, and a reflector 3. FIG. 2 shows the light pipe 2 of FIG. 1. An LED (not shown) is disposed within a hemispherical recess 6 at a lower end of the light pipe 2. The lateral side of the light pipe is a tapered cylinder 7.

Other examples of known LED-based lamps are discussed in U.S. Patent Application Publication No. 2012/0147611 (Huang et al.), U.S. Patent Application Publication No. 2010/0097821 (Huang et al.), U.S. Pat. No. 7,083,315 (Hansler et al.), U.S. Patent Application Publication No. 2009/0129230 (Grotsch), and U.S. Pat. No. 6,356,394 (Glienicke).

SUMMARY

An exemplary embodiment includes a lamp with a housing having at least a transparent portion. A light guide is disposed within the transparent portion. The light guide includes a proximal end configured to receive light from at least one LED. The received light forms an internal beam inside the light guide. The light guide angularly redistributes the LED light to have a specified angular output distribution. The light guide includes a distal end. The distal end has a peripheral portion thereon. The light guide has a longitudinal axis extending from the proximal end to the distal end. The light guide includes a lateral side extending from the peripheral portion of the proximal end to the distal end. In a cross-section that includes the longitudinal axis, the lateral side of the light guide includes both a convex region and a concave region.

This overview is intended to provide an overview of subject matter of the present patent application. It is not intended to provide an exclusive or exhaustive explanation of the subject matter. The detailed description is included to provide further information about the present patent application.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF PREFERRED EMBODIMENTS INCLUDING BEST MODE

In the following description, for purposes of explanation, numerous specific details are set forth in order to provide a thorough understanding of the present disclosure. It may be evident, however, to one skilled in the art, that the subject matter of the present disclosure may be practiced without these specific details.

Figure 3:
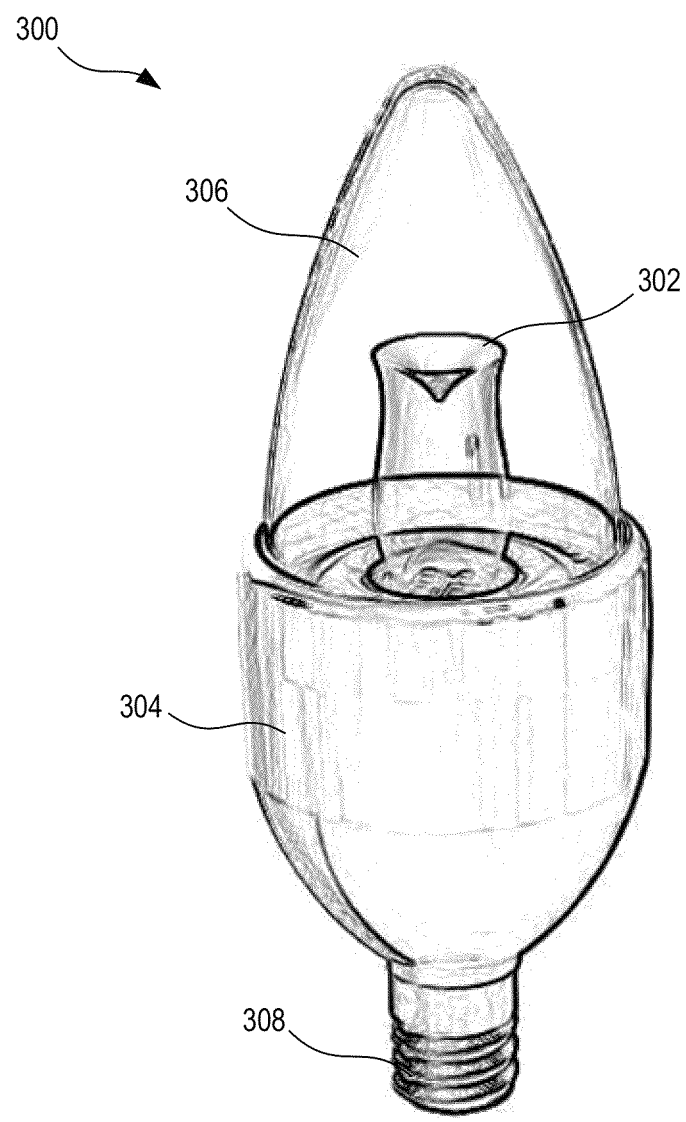
FIG. 3 is a plan drawing of a lamp, according to an example embodiment.

FIG. 3 is a plan drawing of a lamp 300, according to an example embodiment. The lamp 300 includes a housing 304. The housing 304 includes circuitry for powering one or more light emitting diodes (LEDs) within the housing 304. Light from the LEDs is directed through a light guide 302 within the housing 304, which angularly directs the LED light into a specified angular output. The housing 304 includes a transparent portion 306, through which light emerges at the specified angular output. The housing 304 also includes a threaded base 308. An exterior of the housing 304 optionally includes one or more decorative features, such as ridges, or simulated candle wax drippings. In some examples, the housing 304 is sized to match a volume envelope of a particular standardized light bulb, such as a B10 or B12. For these examples, the letter "B" denotes a particular specified bulb shape and size, such as a candelabra. The numerals "10 or "12" indicate that the external thread base diameter is 10 mm ("Miniature Edison Screw") or 12 mm ("Candelabra Edison Screw"), respectively. Other bulb shapes, bulb sizes, and thread sizes are also possible.

Figure 4:
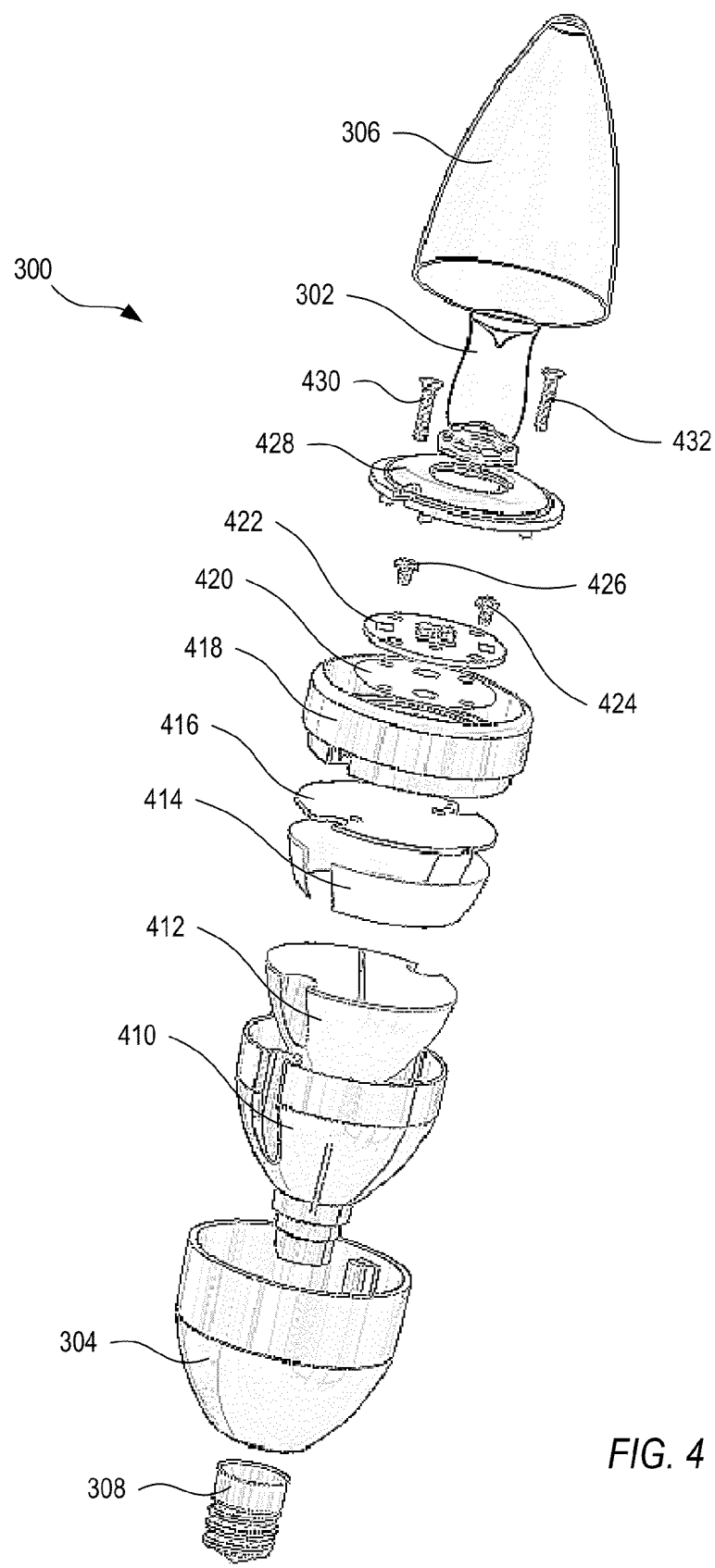
FIG. 4 is an exploded view drawing of the lamp of FIG. 3.

FIG. 4 is an exploded-view drawing of the lamp 300, showing an example configuration of the elements within the housing 304. The threaded base 308 may be a base candelabra screw that provides electronic connections to a corresponding socket. A suitable material for the threaded base 308 is brass, although other materials may also be used. The housing 304 may be a heat sink, and may be formed from aluminum or another suitable material. An LED driver 422 includes circuitry that can convert AC current, from the socket, to a DC current suitable to power the LEDs. The LED driver 422 is housed in an LED housing 412. There is a potting 410 between the LED driver housing 412 and the heat sink housing 304, which is used to increase thermal conductivity between the LED driver housing 412 and the housing 304, and decrease electrical conductivity between the LED driver housing 412 and the housing 304. A typical potting 410 is made with a liquid high-viscosity material, such as a gel. The high-viscosity material is then dried out in air, and becomes hard and solid. A bezel 418 is a metal part above the heat sink, typically made from aluminum, which increases the thermal conductivity between the LED driver 422 and the housing 304. Thermally conductive adhesive 414 is used to secure many of the components, including the bezel 418, in place. A plastic disc 416 increases electrical isolation between the LED driver 422 and the bezel 418. Thermal grease 420 is used to provide smooth thermal conductivity between adjacent parts. Screws 424, 426 secure the LED driver 422 to the LED housing 412. A plastic cover 428 covers the active area of the LED driver 422. Additional screws 430, 432 secure the plastic cover 428 in place. It will be understood that the elements of FIG. 4 are merely an example, and other suitable mechanical configurations may also be used.

Figure 5:
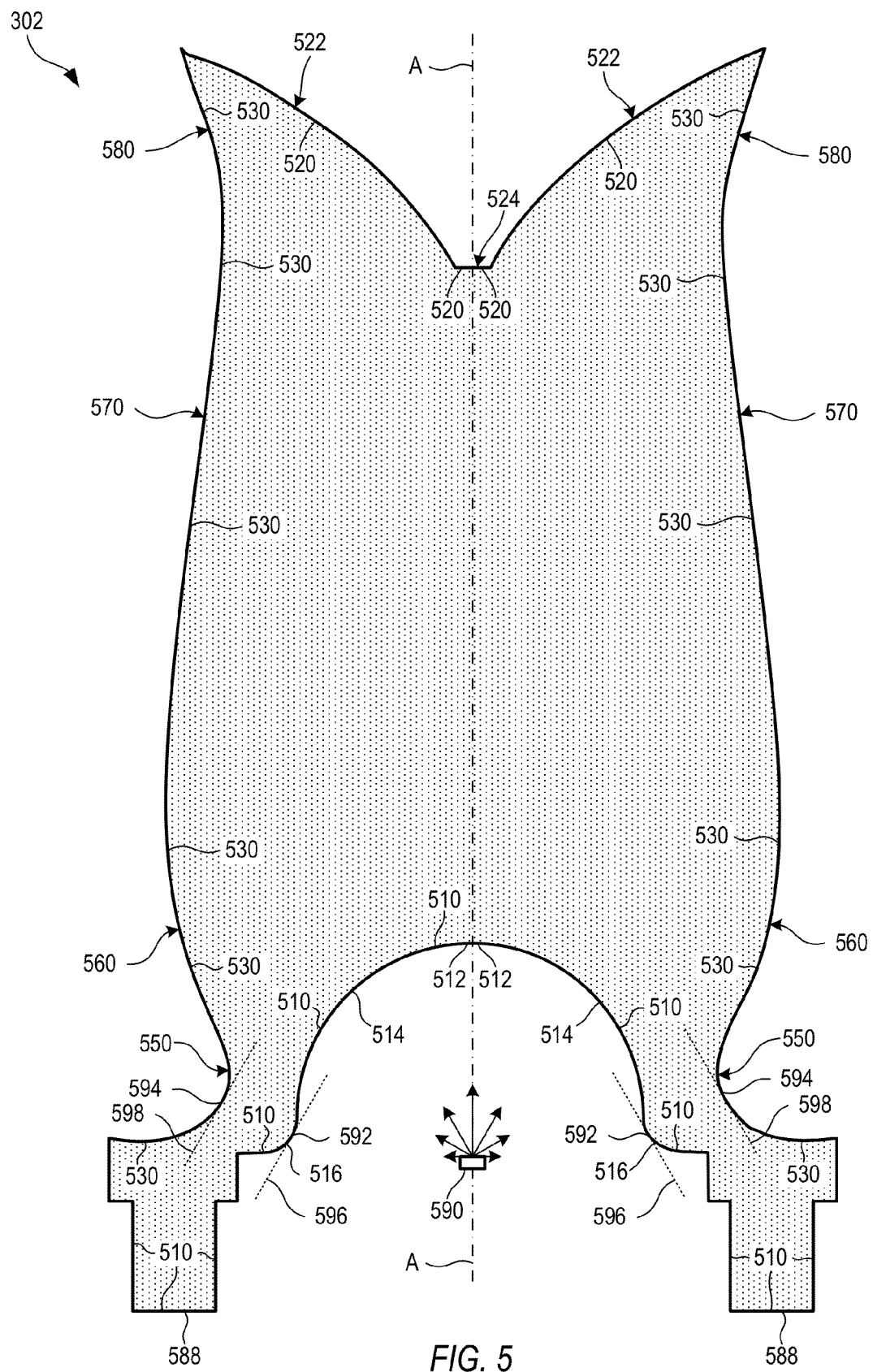
FIG. 5 is a cross-section drawing of a light guide and at least one LED, according to an example embodiment.

FIG. 5 is a cross-sectional drawing of the light guide 302 of FIG. 3. In an example, the light guide 302 is rotationally symmetric about a longitudinal axis (A), so that features and elements of the light guide 302 shown in FIG. 5 are cross-sections of respective surfaces of revolution around the longitudinal axis (A). The light guide 302 is formed from a material that is transparent in the visible portion of the spectrum, such as polymethyl methacrylate (PMMA). The light guide may be formed from molding, grinding and polishing, or another suitable manufacturing process.

Light is produced by one or more LEDs 590, shown near the bottom of FIG. 5. In some examples, there may be three, four, or five LEDs 590. The LEDs 590 are not part of the light guide 302. The LEDs 590 are distributed around the longitudinal axis (A) of the light guide 302. Although the light guide 302 is shown in cross-section in FIG. 5, the single LED shown in FIG. 5, and in subsequent FIGS. 6-10, is illustrated for convenience as one among a plurality of LEDs, and is disposed in front of or behind the plane of the page of the corresponding figures. In most cases, none of the LEDs 590 are aligned with the longitudinal axis (A), and all are disposed away from the longitudinal axis (A). The LEDs 590 may include a common emission plane that is perpendicular to the longitudinal axis (A). The LEDs 590 emit light in a Lambertian distribution, which has a characteristic emission pattern that peaks along the direction of longitudinal axis (A) and decreases to zero at angles perpendicular to the longitudinal axis (A). Most of the light leaving the LEDs 590 travels upward in FIG. 5, with a smaller amount being directed angularly toward the lateral sides of the longitudinal axis (A).

In some examples, the LEDs 590 all emit light at the same wavelength. In some of these examples, the LEDs 590 may be dimmable, with a wavelength spectrum that remains invariant as the intensity is varied. In other examples, at least two of the LEDs 590 emit light at different wavelengths. In some examples, the LEDs 590 include individual LEDs that emit light in the red, green, and blue portions of the spectrum. For these examples, the combined light from the LEDs 590 may simulate a specified color target, such as white light, or the light produced by a compact fluorescent lamp. For some of these examples, the light output of each of the differently colored LEDs may be controlled independently, so that the combined light from the LEDs 590 may be tunable to a desired color target. The tuning may be performed automatically, or may be performed manually by a user. For some of the tunable examples, the LEDs 590 may be dimmable, with a combined wavelength spectrum that remains invariant as the combined intensity is varied.

The light from the LEDs 590 propagates upward in FIG. 5, and enters the light guide 302 through a proximal end 510 of the light guide 302. Light propagates within the light guide 302, with a variety of propagation directions, toward a distal end 520 of the light guide. For some propagation directions, light travels from the proximal end 510 directly to the distal end 520. For some propagation directions, the light reflects from a lateral side 530 of the light guide 302, before reaching the distal end 520 of the light guide 302. For some propagation directions, the light exits through the lateral side 530 of the light guide 302. The proximal end 510, the distal end 520, and the lateral side 530 all extend across a number of features and regions, which are described in detail below.

The proximal end 510 of the light guide 302 may include an optional flat portion 512 surrounding the longitudinal axis (A). Such a flat portion 512 may be laterally sized to accommodate a particular portion of the propagation angles from the LEDs 590; see, for instance, FIG. 10. For examples in which the flat portion 512 is omitted, the region surrounding the longitudinal axis (A) is concave. The proximal end 510 of the light guide 302 includes a concave portion 514. The concave portion 514 can include the flat portion 512, or can surround the longitudinal axis (A) if the flat portion 512 is omitted. In some examples, the concave portion 514 is spherical in shape, with a center of curvature located at or near the intersection between the longitudinal axis (A) and the emission plane of the LEDs 590. For examples in which the flat portion 512 is omitted, the concave portion 514 may be spherical in shape in the area surrounding the longitudinal axis (A). The proximal end 510 of the light guide 302 includes a convex peripheral portion 516 that surrounds the concave portion 514. In some examples, the cross-section of the peripheral portion 516 is spherical in shape, with a center of curvature located external to the light guide 302. In practice, the optional flat portion 512, the concave portion 514, and the convex peripheral portion 516 may fully surround the half-plane emergent from the LEDs 590; these three regions 512, 514, 516 of the proximal end 510 may receive essentially all the light emitted from the LEDs 590. Note that the prior art light pipe 2, shown in FIG. 2, includes a hemispherical recess 6 that extends to a corner, and lacks such a convex peripheral portion 516. The proximal end 510 of the light guide 302 may additionally include non-optical features beyond the convex peripheral portion 516, such as a ridge 588. The non-optical features may be used for mechanically locating the light guide against specified mechanical features in the housing 304, mechanically mounting the light guide 302, or other suitable purposes. These non-optical features do not receive a significant amount of light from the LEDs 590, and do not significantly affect the light output of the lamp 300. The proximal end 510 of the light guide 302 optionally includes an anti-reflection thin-film coating. The optional anti-reflection coating may extend over the optional flat portion 512, the concave portion 514, and the convex peripheral portion 516. The optional anti-reflection coating may or may not extend over the non-optical features of the proximal end 510. Alternatively, the proximal end 510 of the light guide 302 may be devoid of a thin-film coating.

The distal end 520 of the light guide 302 includes a central portion 524 that surrounds the longitudinal axis (A). The central portion 524 may be laterally sized to accommodate a particular portion of the propagation angles from the LEDs 590; see, for instance, FIG. 10. In some examples, the central portion 524 may be sized to accommodate the same portion of the propagation angles from the LEDs 590 as the optional flat portion 512 of the proximal end 510 of the light guide 302. The central portion 524 may be flat, convex, or concave. The distal end 520 of the light guide 302 includes a peripheral portion 522 that surrounds the central portion 524. The peripheral portion 522 extends in the distal direction (e.g., away from the LEDs 590) at increasing distances away from the longitudinal axis (A). The most distal location on the distal end 520 is farthest away from the longitudinal axis (A). The distal end 520 of the light guide 302 appears as a depression, with the most-depressed portion (e.g., the most proximal portion) being the central portion 524. In a cross-section that includes the longitudinal axis (A), the peripheral portion 522 is convex in shape. In some examples, the cross-section of the peripheral portion 522 is spherical in shape. In other examples, the cross-section of the peripheral portion 522 is an optically optimized shape, which lacks a single center of curvature. The distal end of the light guide 502 may be devoid of a thin-film coating, or may optionally be anti-reflection coated.

In an example, the peripheral portion 522 of the distal end 520 of the light guide 302 is frosted. For a frosted optical surface, a particular fraction of incident light is diffusely scattered (e.g., scattered with a random angular component to a propagation direction) into a reflected and/or transmitted space. The remaining fraction of incident light is specularly reflected or transmitted; this fraction is referred to herein as being reflected in part, or transmitted in part, respectively. The amount of scattering varies between 0% and 100%, and depends on the amount of frosting. For instance, a mild frosting may have a very low percentage of incident light being scattered and a very high percentage of incident light being specularly reflected or transmitted. Similarly, a more severe frosting may have a very high percentage of incident light being scattered and a very low percentage of incident light being specularly reflected or transmitted. For the simulated performance curves presented below in FIG. 15, the frosting level is set so that 50% of the incident light is scattered, and 50% is specularly reflected or transmitted. The level of 50% is merely an example, and other suitable frosting values may also be used.

The lateral side 530 of the light guide 302 extends from a location adjacent the peripheral portion 522 of the distal end 520 to a location adjacent the proximal end 510. The lateral side 530 has a first region 550, a second region 560, a third region 570, and a fourth region 580, extending successively from the proximal end 510 to the distal end 520. The first region 550 is concave. The second region 560 is convex. The fourth region 580 is concave. The third region 570 is a smooth and continuous transition region or inflection region between the convex second region 560 and the concave fourth region 580. In a cross-section that includes the longitudinal axis (A), as in FIG. 5, the lateral side 530 includes both a convex region and a concave region. In some examples, the lateral side 530 transitions between the convex and concave regions smoothly and continuously, such as without corners or discontinuities. The convex region of the lateral side 530 includes the second region 560. The concave regions of the lateral side 530 include the first region 550 and the fourth region 580. The lateral side 530 is shaped so that for relatively low angles of propagation away from the LEDs 590 (such as at regions 560, 570, 580), light that strikes the lateral side 530 will be reflected via total internal reflection. This behavior is shown in more detail in FIGS. 7 and 8. The lateral side 530 is also shaped so that at relatively high angles of propagation away from the LEDs 590 (such as at region 550), light that strikes the lateral side 530 will be transmitted through the lateral side 530. This behavior is shown in more detail in FIG. 6. The concave first region 550 of the lateral side 530 overlaps the convex peripheral portion 516 of the proximal end 510, so that at least a portion of the concave first region 550 is at the same longitudinal location along the longitudinal axis (A) as at least a portion of the convex peripheral portion 516. The concave fourth region 580 of the lateral side 530 overlaps the distal end 520, so that at least a portion of the concave fourth region 580 is at the same longitudinal location along the longitudinal axis (A) as at least a portion of the distal end 520. The overall shape of the lateral side 530 is an optically optimized curve, which does not have a single center of curvature. The lateral side 530 is devoid of a thin-film coating. The lateral side 530 of the light guide 302 may additionally include non-optical features at or near its proximal end, which do not significant affect the light output of the light guide 302.

During operation, light emerges from the LEDs 590 with a full angular bundle of rays that extend over a full half-plane. The full angular bundle may be referred to as an internal beam. Different portions of the internal beam exhibit different behaviors, and light travels differently from surface-to-surface within the light guide 302 for the different portions. It is beneficial to analyze separately these different portions of the internal beam, keeping in mind that during operation, the internal beam exhibits all of these behaviors simultaneously. FIGS. 6-10 show traces of light rays inside the light guide 302 for different portions of the internal beam.

Figure 6:
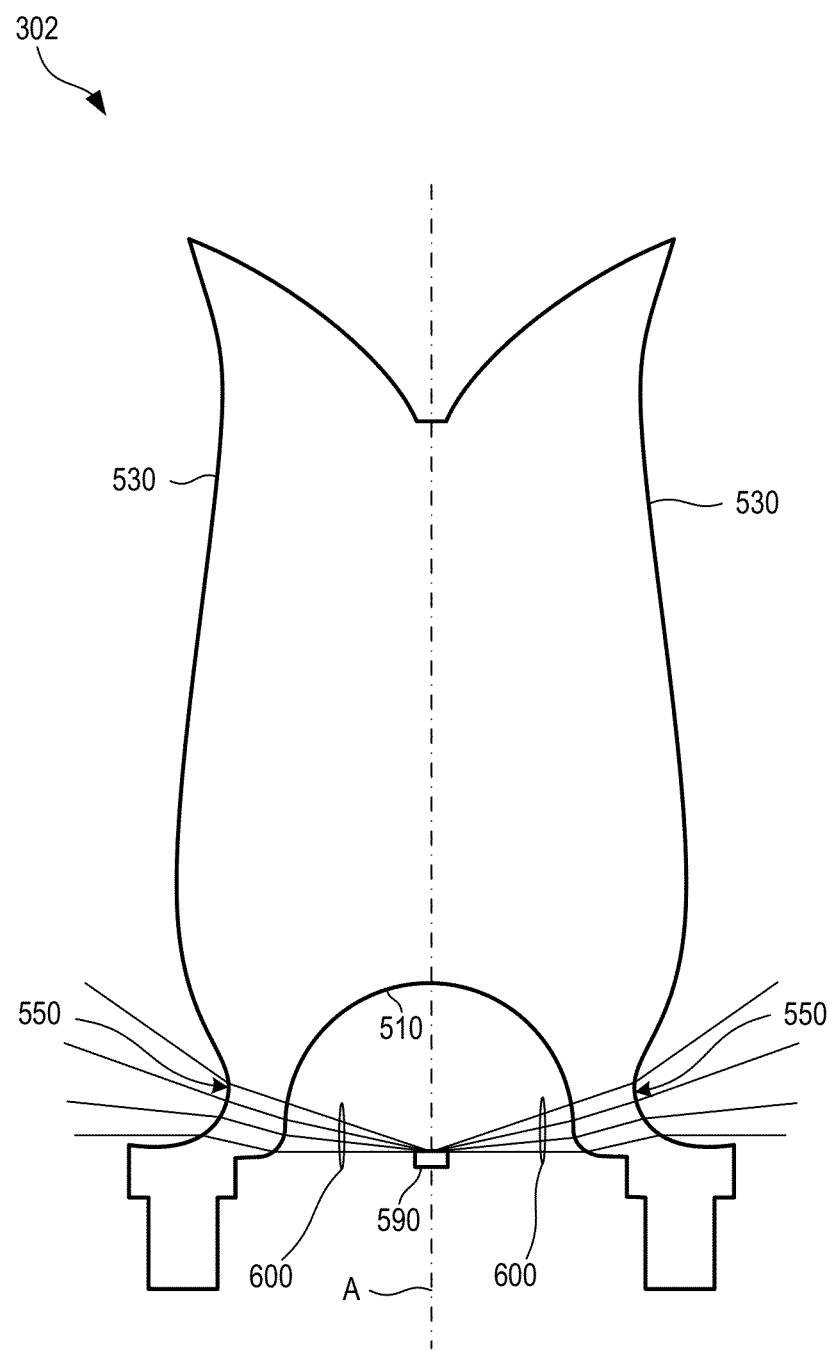
FIG. 6 is a schematic drawing of one group of light rays propagating from the LEDs, and through the light guide of FIG. 5, according to an example embodiment.

FIG. 6 is a schematic drawing of one group of light rays propagating from the LEDs 590, and through the light guide 302 of FIG. 5. This particular group of rays is referred to as a first portion 600 of the internal beam. This first portion 600 extends directly from the proximal end 510 of the light guide 302 to the first region 550 of the lateral side 530 of the light guide 302. The first portion 600 then exits the light guide 302 by transmitting through the first region 550. Because the first region 550 is configured for transmission therethrough, and not reflection therefrom, it is desirable that the rays transmitting through the first region do so at relatively low angles of incidence. It is also desirable that the rays enter the light guide 302 at relatively low angles of incidence through the convex peripheral portion 516 of the proximal end 510 of the light guide 302. Referring back to FIG. 5, the convex peripheral portion 516 of the proximal end 510 of the light guide includes a location 592 and has a surface tangent 596 at the location. Also referring to FIG. 5, the first region 550 of the lateral side 530 of the light guide 302 includes a location 594 and has a surface tangent 598 that is parallel to surface tangent 596. In other words, at least a location 592 on the convex peripheral portion 516 of the proximal end 510 of the light guide 302 is parallel to at least a location 594 on the first region 550 of the lateral side 530 of the light guide 302.

Figure 16:
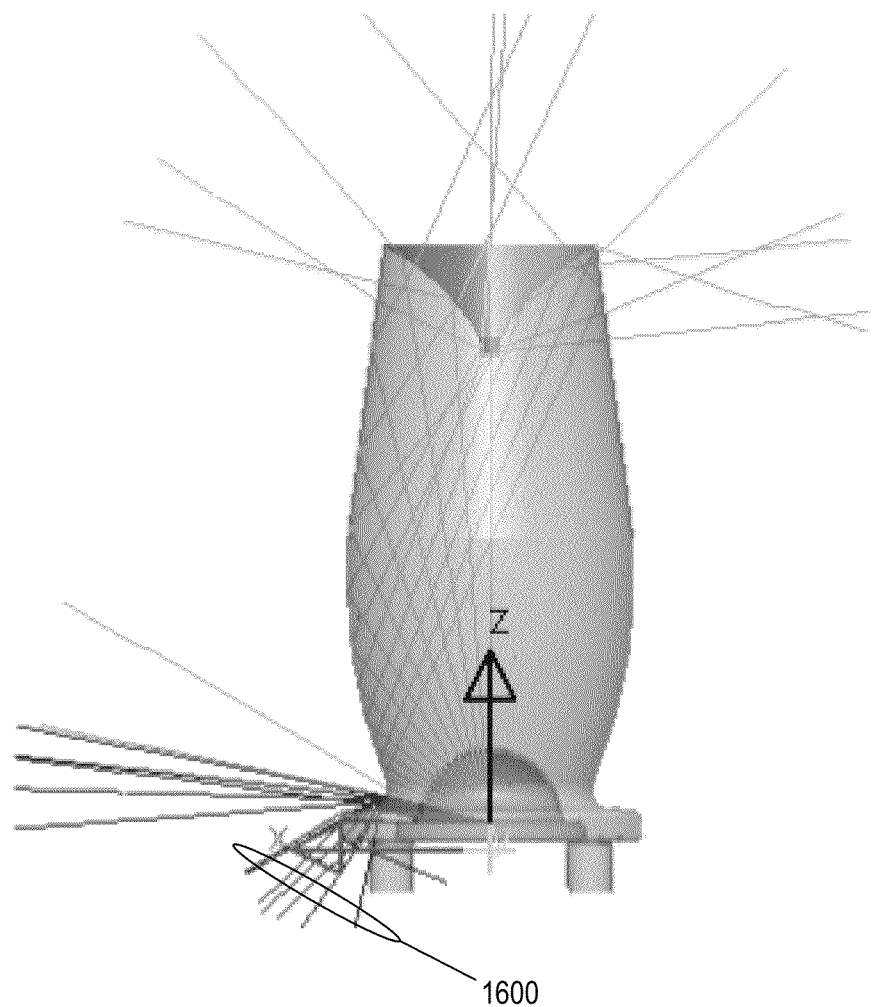
FIG. 16 is a schematic drawing of a group of light rays propagating through the known light guide of FIG. 2.

It is advantageous that the rays in the first portion 600 of the internal beam contribute to the output of the lamp 300. In contrast, for many known lamps, rays exiting the LED(s) at high angles of exitance are blocked by the geometry of the light guide from contributing to the lamp output. For instance, FIG. 16 is a schematic drawing of a newly-performed ray trace through the known light pipe 2 of FIG. 2. In this ray-trace, a group of rays 1600 exits an LED located at the center of hemispherical recess 6. The group of rays 1600 is shown in FIG. 16 to exit the light pipe 2 with a downward direction; in practice, these rays would strike a mounting surface and would not contribute to the output of the lamp. The present light guide 302 includes the rays at the high angles of exitance as part of the lamp output, as shown in FIG. 6, and therefore achieves a significant improvement in performance over the known light pipe 2 of FIG. 2.

Figure 7:
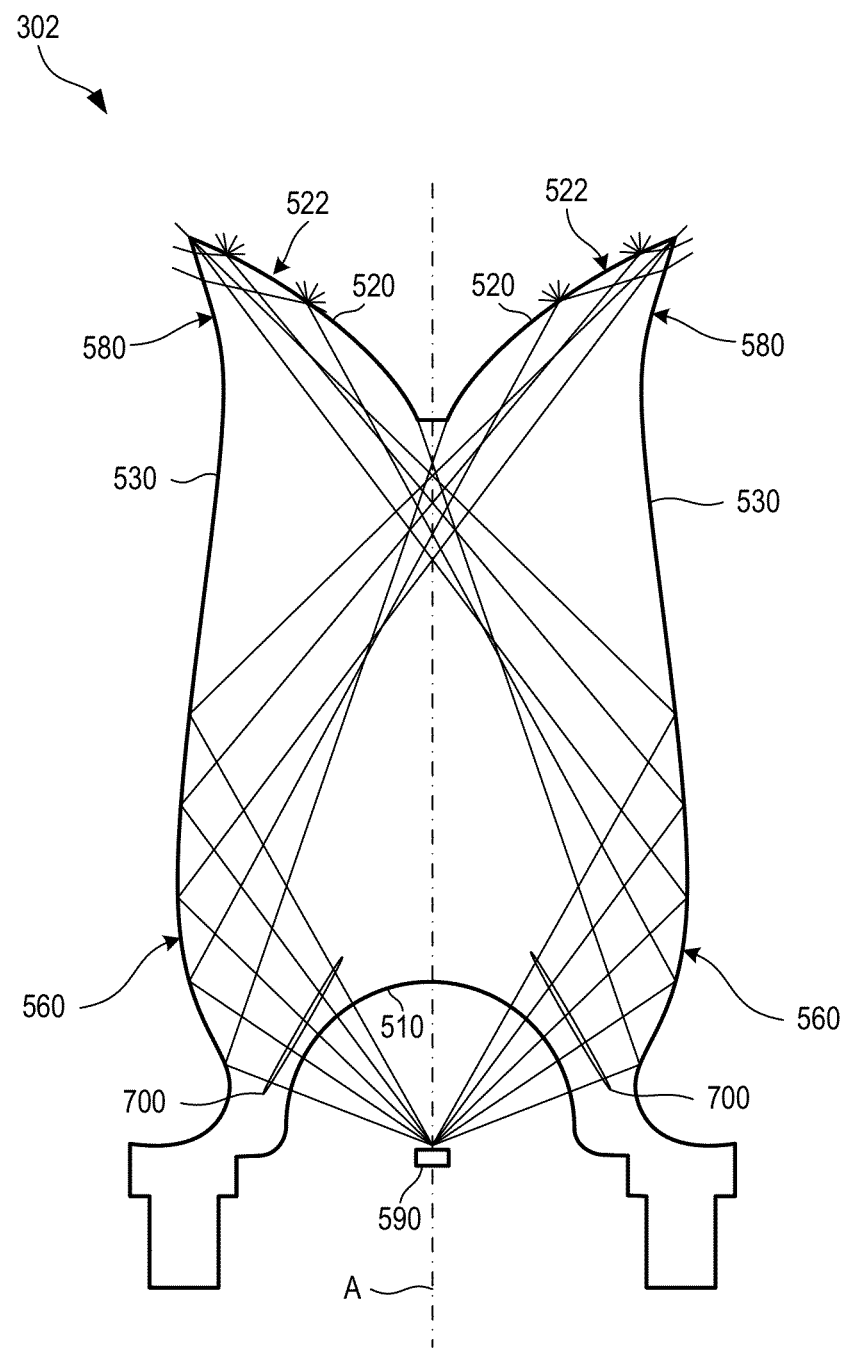
FIG. 7 is a schematic drawing of another group of light rays propagating from the LEDs, and through the light guide of FIG. 5, according to an example embodiment.

FIG. 7 is a schematic drawing of another group of light rays, referred to as a second portion 700 of the internal beam, propagating from the LEDs 590, and through the light guide 302 of FIG. 5. The second portion 700 extends directly from the proximal end 510 of the light guide 302 to the second region 560 of the lateral side 530 of the light guide 302. The second portion 700 reflects via total internal reflection from the second region 560. After reflection, the second portion 700 crosses the longitudinal axis (A) of the light guide 302, then strikes the peripheral portion 522 of the distal end 520 of the light guide 302. The peripheral portion 522 is frosted, so that a specified fraction of the second portion 700 diffusely scatters at the peripheral portion 522, and a specified fraction of the second portion 700 specularly reflects. In some examples, the specified fraction is 50% for both the scattered portion and the specularly reflected portion. The specularly reflected portion strikes the fourth region 580 of the lateral side 530 of the light guide 302, transmits through the fourth region 580, and exits the light guide 302.

Figure 8:
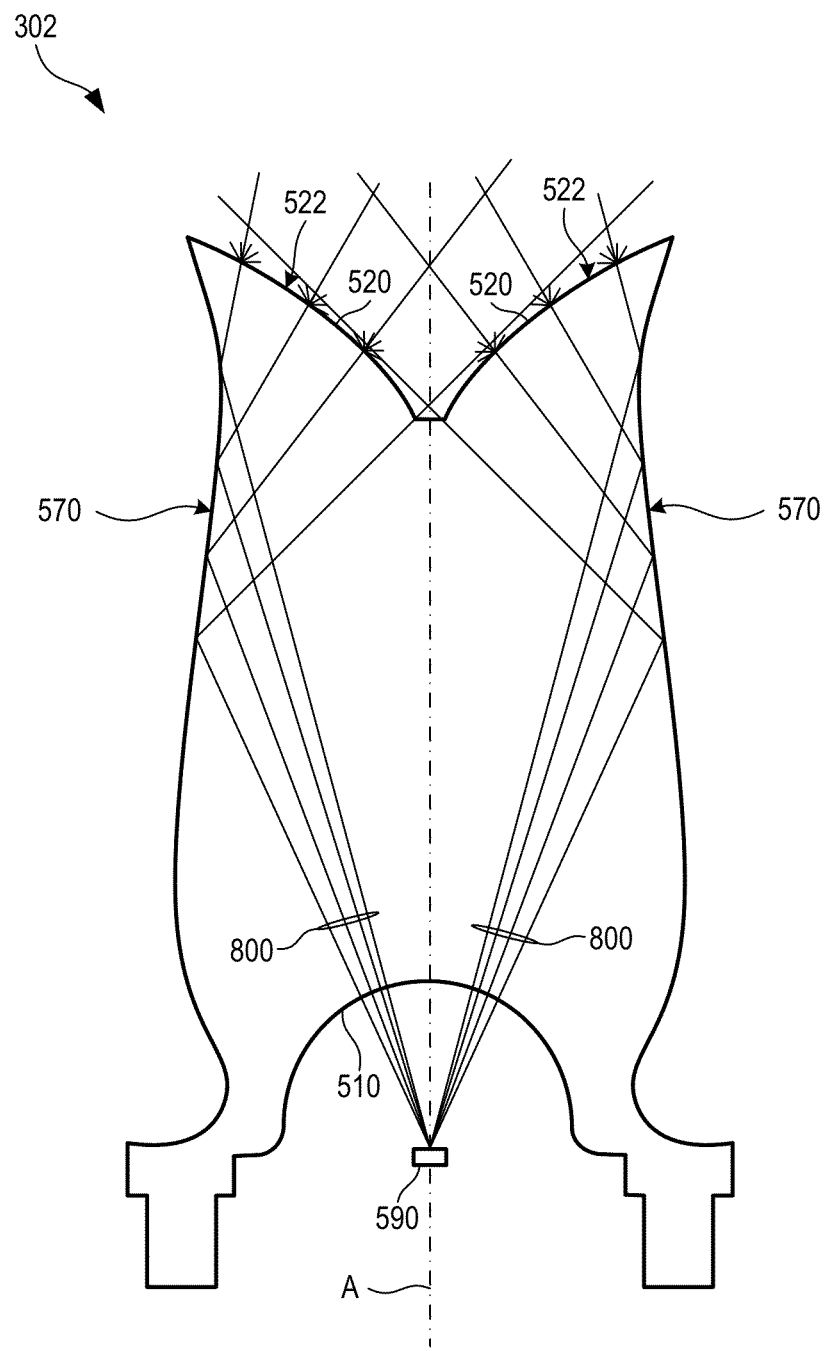
FIG. 8 is a schematic drawing of another group of light rays propagating from the LEDs, and through the light guide of FIG. 5, according to an example embodiment.

FIG. 8 is a schematic drawing of another group of light rays, referred to as a third portion 800 of the internal beam, propagating from the LEDs 590, and through the light guide 302 of FIG. 5. The third portion 800 extends directly from the proximal end 510 of the light guide 302 to the third region 570 of the lateral side 530 of the light guide 302. The third portion 800 reflects via total internal reflection from the third region 570. After reflection, the third portion 800 strikes the peripheral portion 522 of the distal end 520 of the light guide 302. The peripheral portion 522 is frosted, so that a specified fraction of the third portion 800 diffusely scatters at the peripheral portion 522, and a specified fraction of the third portion 800 specularly transmits. In some examples, the specified fraction is 50% for both the scattered portion and the specularly transmitted portion. The specularly transmitted portion transmits through the peripheral portion 522 of the distal end 520, and exits the light guide 302.

Figure 9:
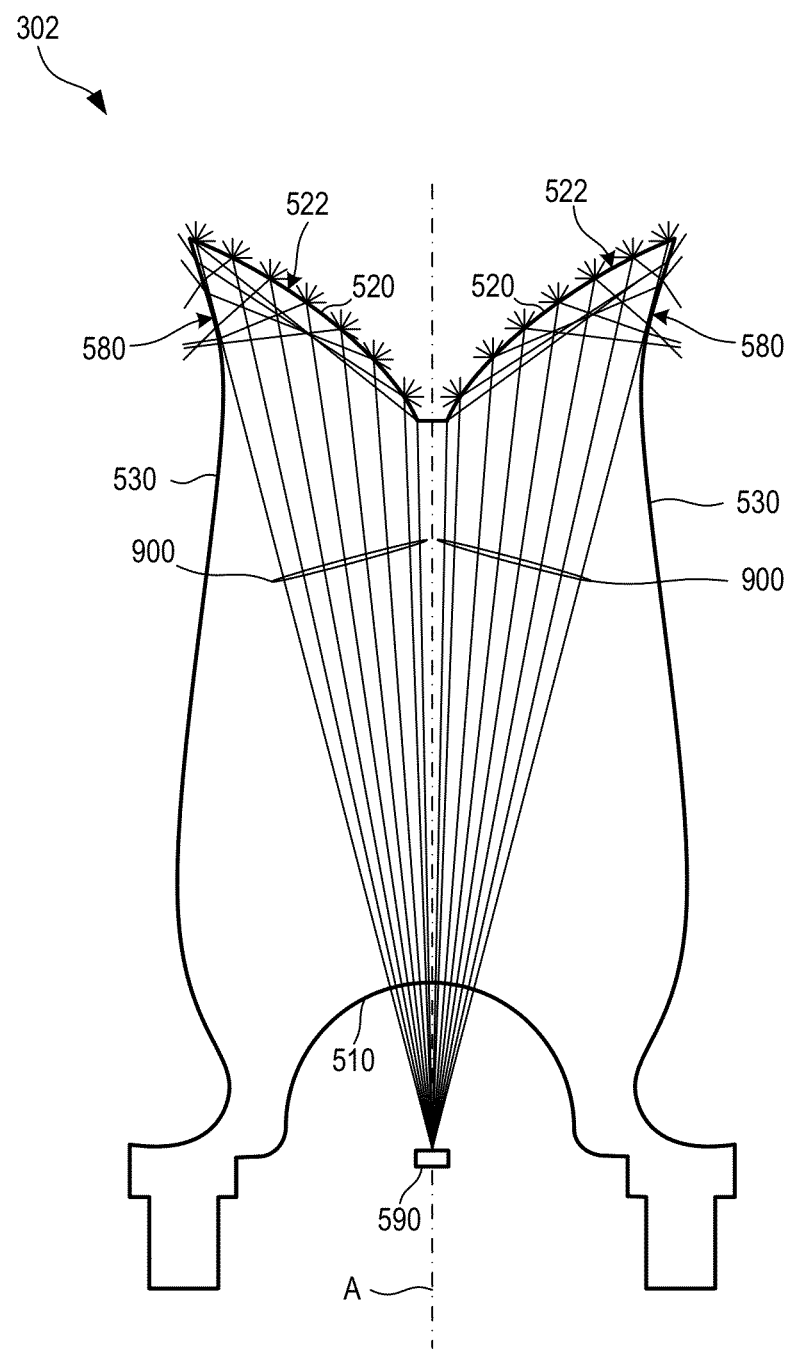
FIG. 9 is a schematic drawing of another group of light rays propagating from the LEDs, and through the light guide of FIG. 5, according to an example embodiment.

FIG. 9 is a schematic drawing of another group of light rays, referred to as a fourth portion 900 of the internal beam, propagating from the LEDs 590, and through the light guide 302 of FIG. 5. The fourth portion 900 extends directly from the proximal end 510 of the light guide 302 to the peripheral portion 522 of the distal end 520 of the light guide 302. The peripheral portion 522 is frosted, so that a specified fraction of the fourth portion 900 diffusely scatters at the peripheral portion 522, and a specified fraction of the fourth portion 900 specularly reflects. In some examples, the specified fraction is 50% for both the scattered portion and the specularly reflected portion. The specularly reflected portion strikes the fourth region 580 of the lateral side 530 of the light guide 302, transmits through the fourth region 580, and exits the light guide 302.

Figure 10:
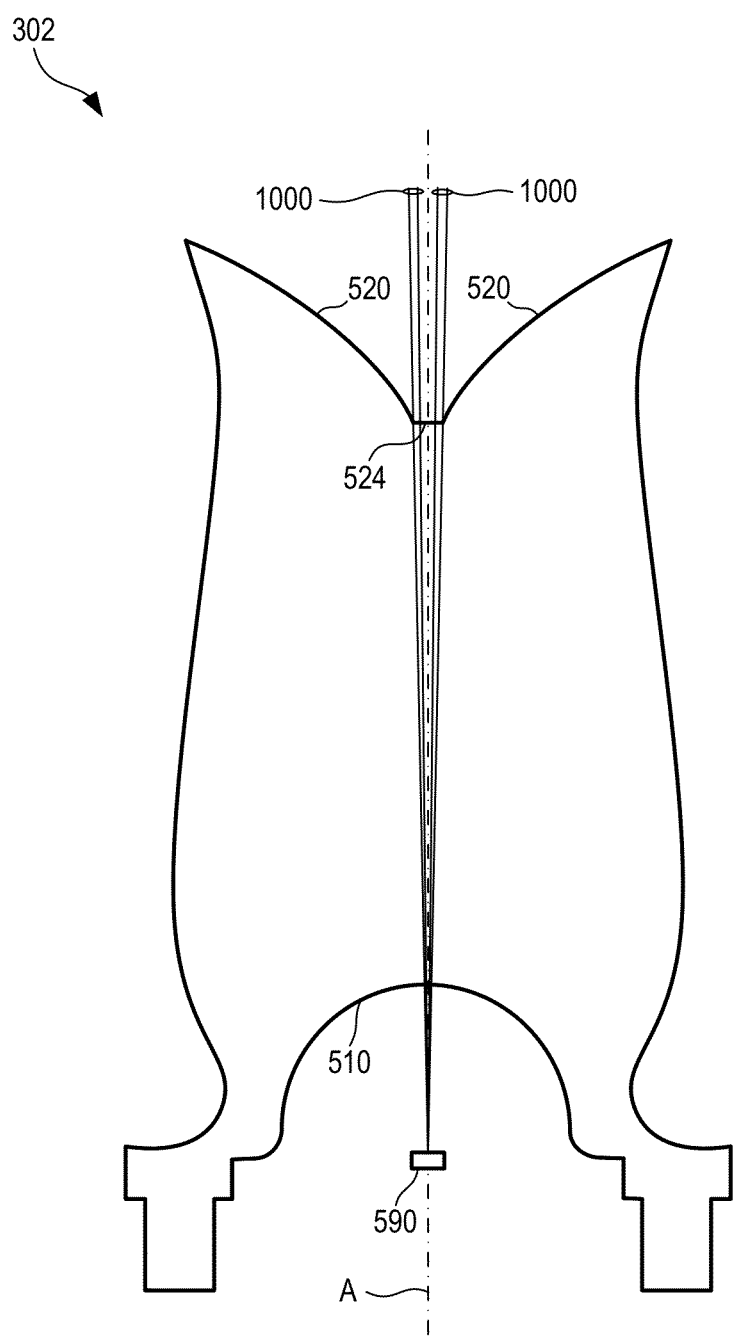
FIG. 10 is a schematic drawing of another group of light rays propagating from the LEDs, and through the light guide of FIG. 5, according to an example embodiment.

FIG. 10 is a schematic drawing of another group of light rays, referred to as a fifth portion 1000 of the internal beam, propagating from the LEDs 590, and through the light guide 302 of FIG. 5. The fifth portion 1000 extends directly from the proximal end 510 of the light guide 302 to the central portion 524 of the distal end 520 of the light guide 302. The fifth portion 1000 transmits through the central portion 524 of the distal end 520, and exits the light guide 302.

In practice, light in the fifth portion 1000 is usually considered undesirable, since this light exits the top of the lamp 300 and propagates directly upward from the lamp 300. Note that light in the fifth portion 1000 originates from a point on-axis or close to on-axis (e.g., at or near the intersection between the longitudinal axis (A) and the emission plane of the LEDs 590). As a result, it is possible to reduce or eliminate light in the fifth portion 1000 by using an off-axis configuration of the LEDs 590. Specifically, if all the LEDs 590 are located off-axis, then there is little or no light propagating along the longitudinal axis (A) or close to the longitudinal axis (A), as in FIG. 10. Light from the off-axis LEDs 590, instead of striking the central portion 524, strikes the peripheral portion 522, as in FIG. 9, and forms a desirable portion of the output from the lamp 300.

Figure 11:
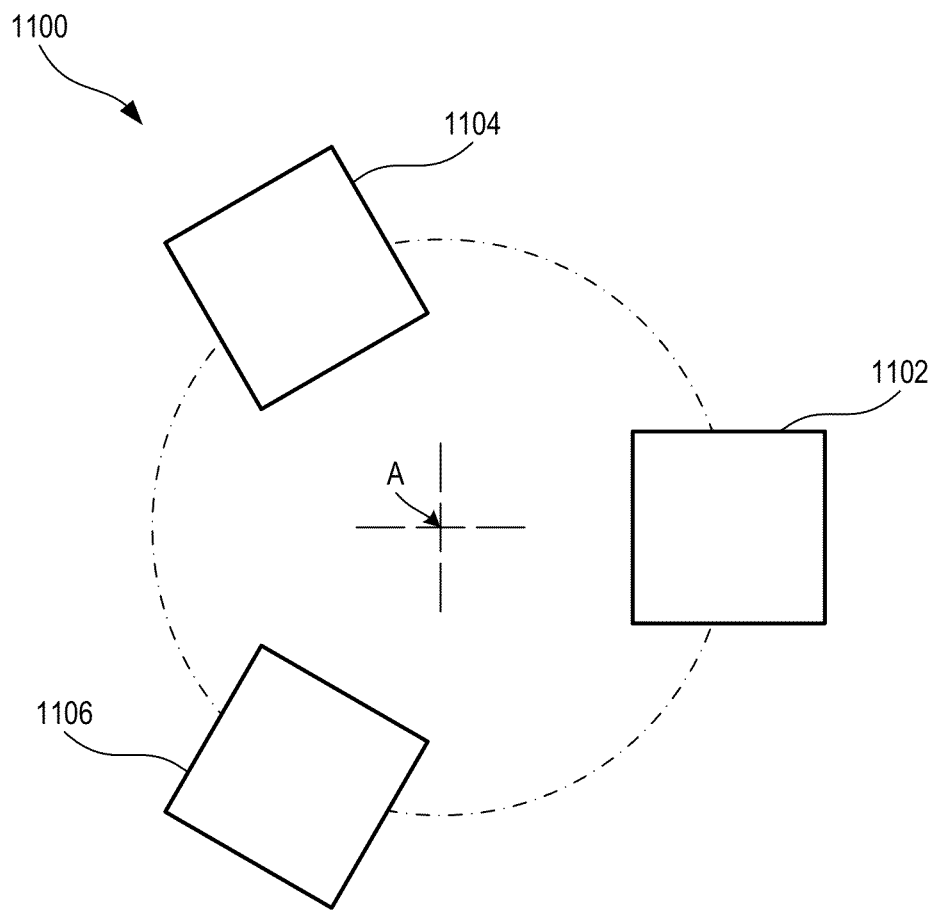
FIG. 11 is a schematic drawing of three LEDs, arranged circumferentially around the longitudinal axis of the light guide, according to an example embodiment.
Figure 12:
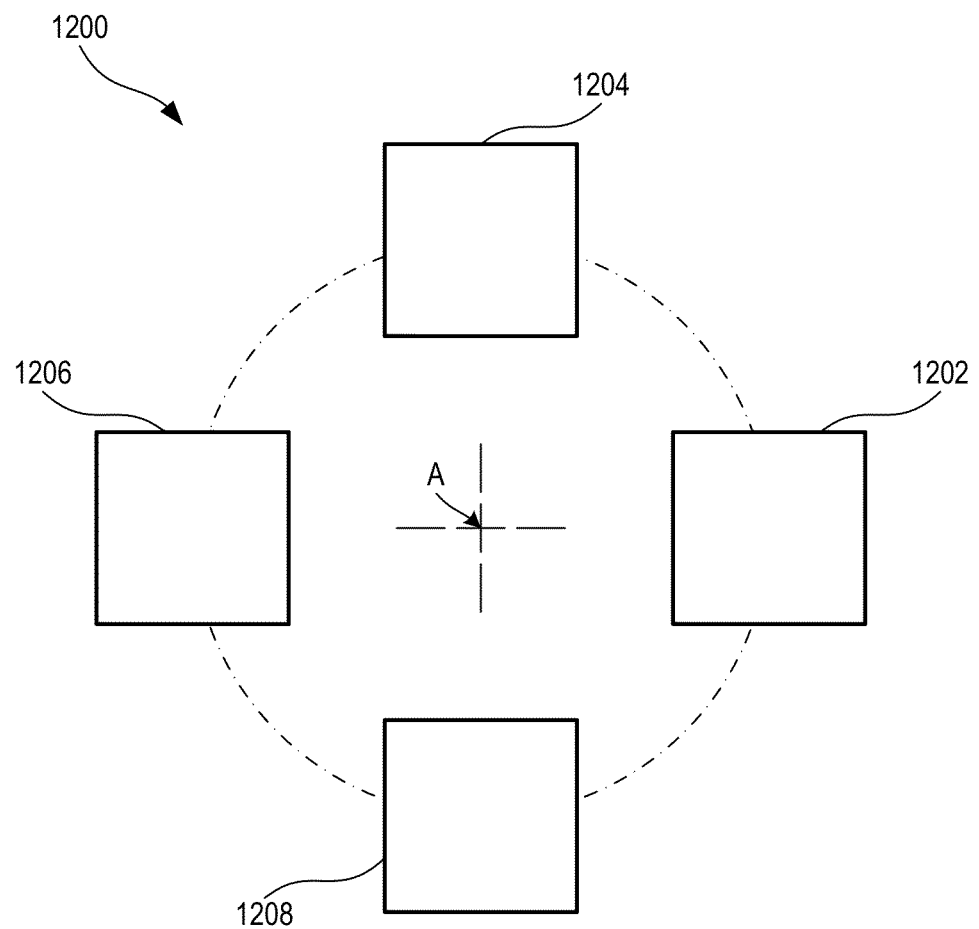
FIG. 12 is a schematic drawing of four LEDs, arranged circumferentially around the longitudinal axis of the light guide, according to an example embodiment.
Figure 13:
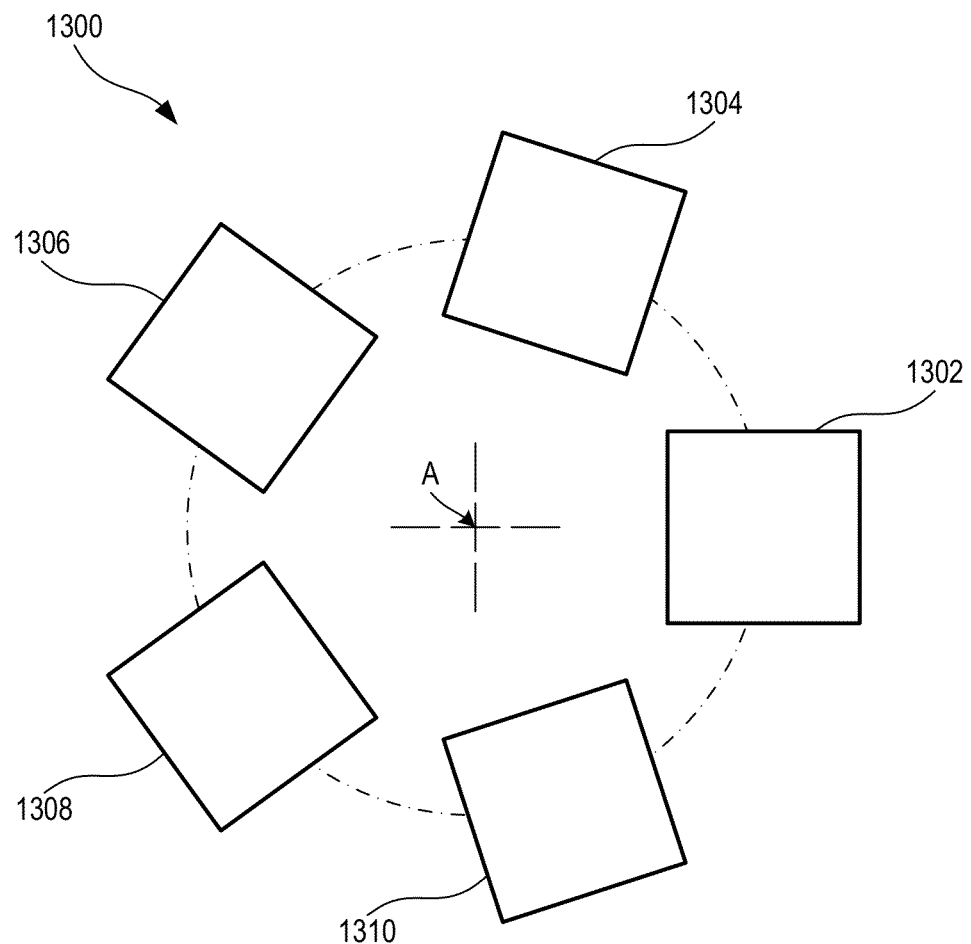
FIG. 13 is a schematic drawing of five LEDs, arranged circumferentially around the longitudinal axis of the light guide, according to an example embodiment.

There are many possible configurations for the LEDs 590. In three examples, shown in FIGS. 11-13, the LEDs are distributed in a circle, and are evenly spaced around the circle. In each of these examples, the LEDs are arranged circumferentially around the longitudinal axis (A) of the light guide, and are spaced away from the longitudinal axis (A). FIG. 11 is a schematic drawing of an LED configuration 1100 having three LEDs 1102, 1104, 1106, arranged circumferentially around the longitudinal axis (A) of the light guide. FIG. 12 is a schematic drawing of an LED configuration 1200 having four LEDs 1202, 1204, 1206, 1208, arranged circumferentially around the longitudinal axis (A) of the light guide. FIG. 13 is a schematic drawing of an LED configuration 1300 having five LEDs 1302, 1304, 1306, 1308, 1310, arranged circumferentially around the longitudinal axis (A) of the light guide. Other configurations are possible, in which the LEDs are spaced unevenly around a circle, or are arranged in another shape around the longitudinal axis (A) of the light guide. In other examples, fewer than three or more than five LEDs are used.

Figure 1:
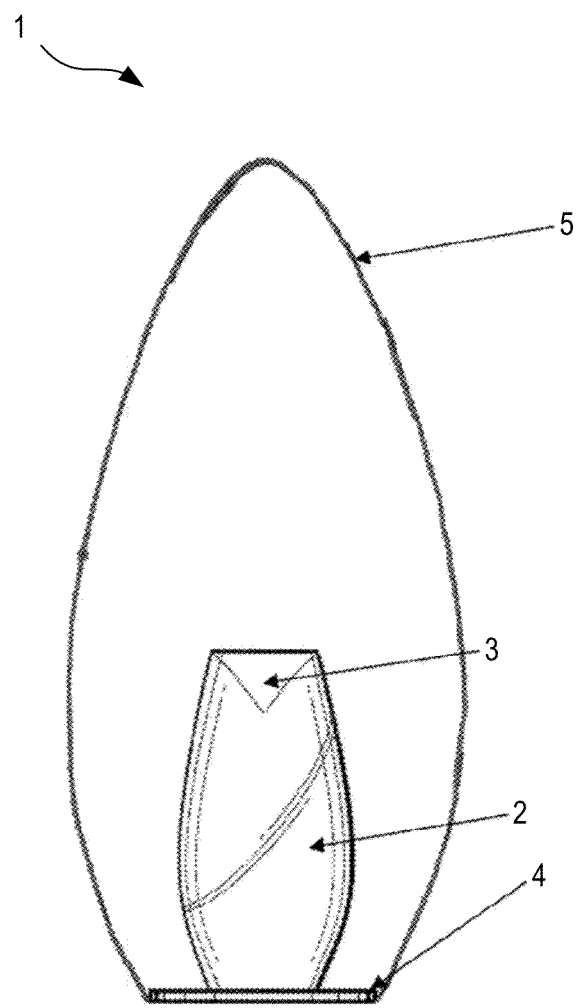
FIG. 1 is a plan drawing of a known lamp.
Figure 2:
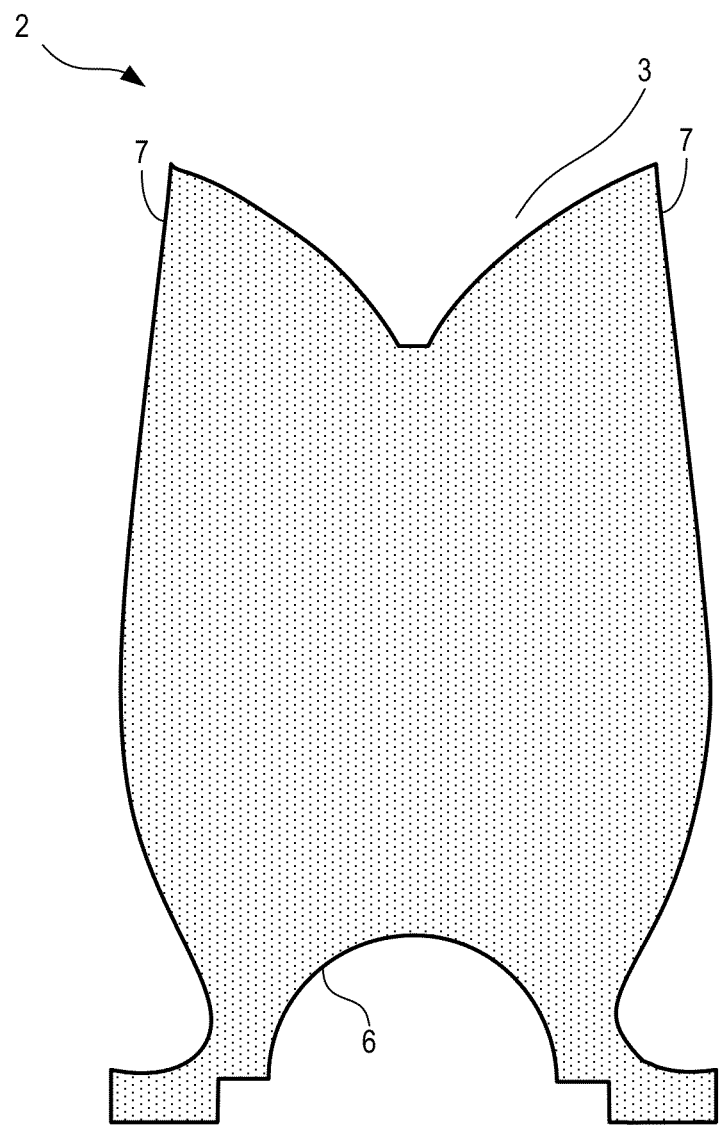
FIG. 2 is a cross-section drawing of a known light guide from the known lamp of FIG. 1.
Figure 14:
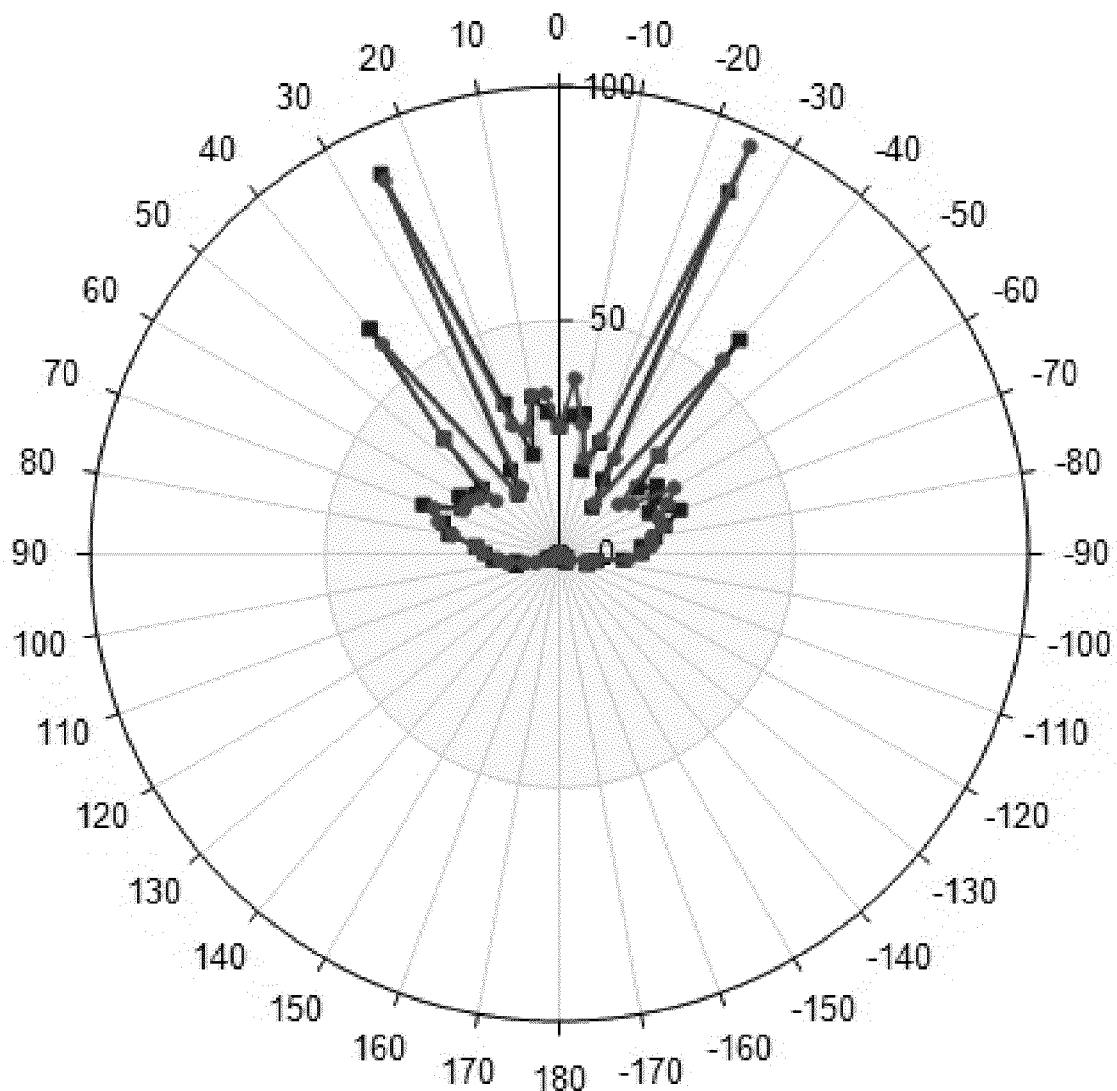
FIG. 14 is a polar plot of simulated light output for the known lamp of FIG. 1, which includes the known light guide of FIG. 2.
Figure 15:
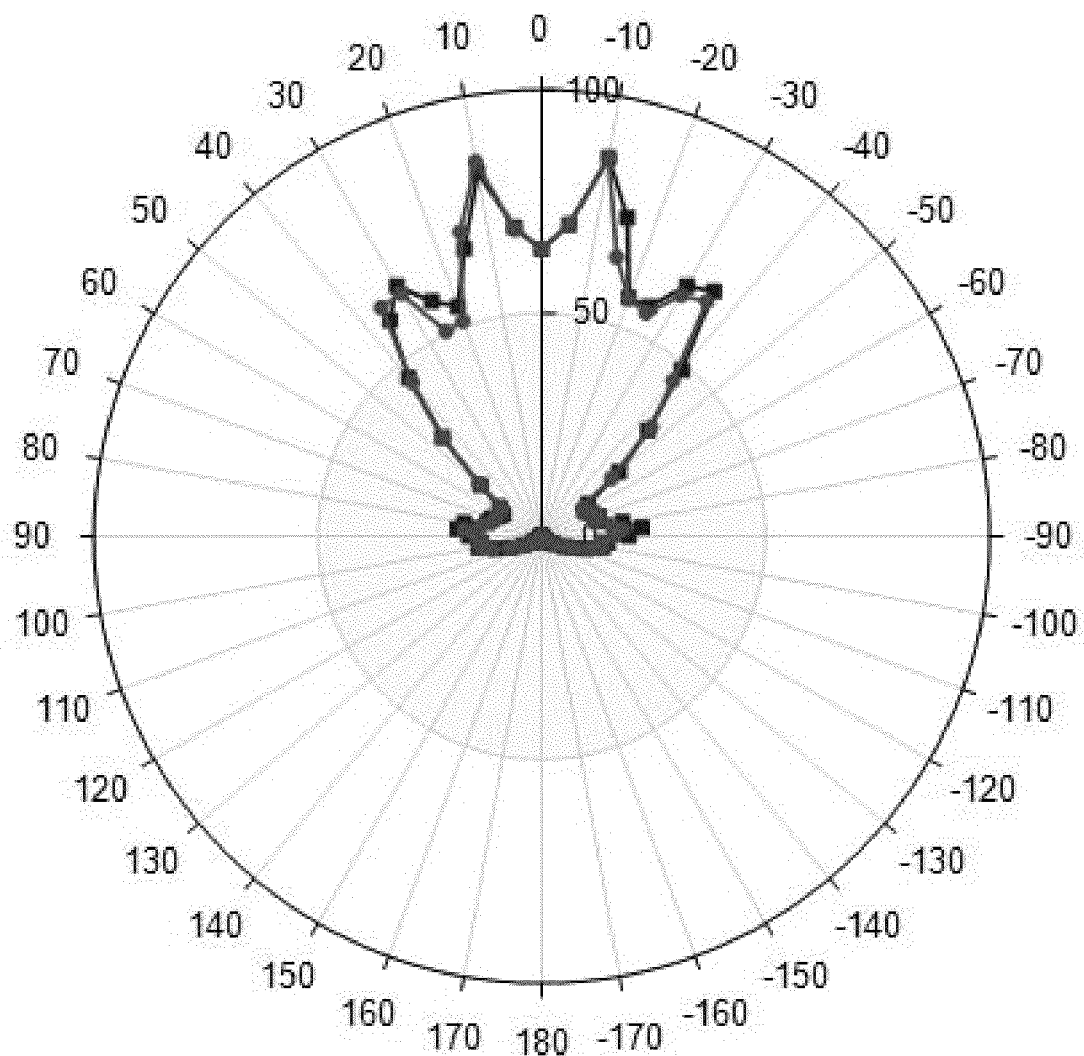
FIG. 15 is a polar plot of simulated light output for the lamp of FIG. 3, which includes the light guide of FIG. 5, according to an example embodiment.

FIGS. 14 and 15 compare the present light guide of FIG. 5 to the known light guide of FIG. 2. FIG. 14 is a polar plot of simulated light output for the known lamp of FIG. 1, which includes the known light guide of FIG. 2. FIG. 15 is a polar plot of simulated light output for the lamp of FIG. 3, which includes the light guide of FIG. 5. In addition to the angular distribution of the output light, both figures also show a value of calculated efficiency, expressed as a number between zero and one. The calculated efficiency is the total light output of the light guide, summed over all directions, divided by the total light output of the LEDs.

The calculated value of efficiency for the present light guide is 0.939 (i.e., 93.9%), compared with 0.892 (i.e., 89.2%) for the known light guide. One contributor to this increase in efficiency is that the present light guide more effectively handles rays at high angles of exitance from the LEDs, such as those shown in FIG. 6. In addition to the increase in efficiency, the calculated performance of the present light guide shows a reduction in the sharp peaks on the polar plot, which is desirable. This reduction in peaks may desirably give the lamp a more uniform appearance, when viewed from a variety of angles or viewing positions.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

GLOSSARY

A Non-Limiting Summary of Above Reference Numerals 1 known light bulb
2 light pipe of known light bulb
3 reflector of known light bulb
4 base of light pipe of known light bulb
5 envelope of known light bulb
6 hemispherical recess at distal end of light guide of known light bulb
7 tapered cylinder on lateral side of light guide of known light bulb
300 lamp
302 light guide
304 housing
306 transparent portion of housing
308 threaded base
410 potting
412 LED driver housing
414 thermally conductive adhesive
416 plastic disc
418 bezel
420 thermal grease
422 LED driver
424 screw
426 screw
428 plastic cover
430 screw
432 screw
510 proximal end of light guide
512 flat portion of proximal end of light guide
514 concave portion of proximal end of light guide
516 convex peripheral portion of proximal end of light guide
520 distal end of light guide
522 peripheral portion of distal end of light guide
524 central portion of distal end of light guide
530 lateral side of light guide
550 first region of lateral side of light guide
560 second region of lateral side of light guide
570 third region of lateral side of light guide
580 fourth region of lateral side of light guide
588 ridge
590 at least one light emitting diode
592 location on the convex peripheral portion of proximal end of light guide
594 location on the first region of the lateral side of the light guide
596 surface tangent at location 592
598 surface tangent at location 594
600 first portion of internal beam
700 second portion of internal beam
800 third portion of internal beam
900 fourth portion of internal beam
1000 fifth portion of internal beam
1100 LED configuration having three LEDs
1102 LED
1104 LED
1106 LED
1200 LED configuration having four LEDs
1202 LED
1204 LED
1206 LED
1208 LED
1300 LED configuration having five LEDs
1302 LED
1304 LED
1306 LED
1308 LED
1310 LED
1600 group of rays
A longitudinal axis

What is claimed is:

1. A lamp (300), comprising:
a light guide (302) including a proximal end (510) configured to receive light from at least one light emitting diode (590), the proximal end (510) forming the received light into an internal beam inside the light guide (302),
the light guide (302) including a distal end (520), the distal end (520) having a peripheral portion (522) thereon;
the light guide (302) having a longitudinal axis (A) extending from the proximal end (510) to the distal end (520),
the light guide (302) including a lateral side (530) extending from a location adjacent the peripheral portion (522) of the distal end (520) to a location adjacent the proximal end (510),
wherein the lateral side (530) of the light guide (302) has a first region (550), a second region (560), a third region (570), and a fourth region (580), the first, second, third, and fourth regions extending successively from the proximal end (510) to the distal end (520);
wherein in a cross-section that includes the longitudinal axis (A), the first region (550) is concave, the second region (560) is convex, the fourth region (580) is concave, and the third region (570) includes a smooth and continuous transition between the second region (560) and the fourth region (580);
wherein in a cross-section that includes the longitudinal axis (A), the proximal end (510) of the light guide (302) has a concave portion (514) surrounded by a convex peripheral portion (516); and
wherein, in a cross-section that includes the longitudinal axis (A), at least a portion of the convex peripheral portion (516) and a portion of the concave first region (550) are at the same longitudinal location along the longitudinal axis (A).

2. The lamp (300) of claim 1, wherein in the cross-section that includes the longitudinal axis (A), the third region (570) of the lateral side (530) comprises an inflection point between the convex second region (560) and the concave fourth region (580).

3. The lamp (300) of claim 1, wherein at least a portion of the fourth region (580) and a portion of the distal end (520) are at the same longitudinal location along the longitudinal axis (A).

4. The lamp (300) of claim 1, wherein a first portion (600) of the internal beam:
extends directly from the proximal end (510) of the light guide (302) to the first region (550) of the lateral side (530) of the light guide (302); and
exits the light guide (302) by transmitting through the first region (550).

5. The lamp (300) of claim 1, wherein a second portion (700) of the internal beam:

extends directly from the proximal end (510) of the light guide (302) to the second region (560) of the lateral side (530) of the light guide (302);

reflects via total internal reflection off the second region (560);

crosses the longitudinal axis (A) of the light guide (302);

strikes the peripheral portion (522) of the distal end (520) of the light guide (302);

reflects, in part, from the peripheral portion (522);

strikes the fourth region (580) of the lateral side (530) of the light guide (302); and exits the light guide (302) by transmitting through the fourth region (580).

6. The lamp (300) of claim 1, wherein a third portion (800) of the internal beam:

extends directly from the proximal end (510) of the light guide (302) to the third region (570) of the lateral side (530) of the light guide (302);

reflects via total internal reflection from the third region (570);

strikes the peripheral portion (522) of the distal end (520) of the light guide (302); and exits the light guide (302) by transmitting, in part, through the peripheral portion (522).

7. The lamp (300) of claim 1, wherein a fourth portion (900) of the internal beam:

extends directly from the proximal end (510) of the light guide (302) to the peripheral portion (522) of the distal end (520) of the light guide (302);

reflects, in part, from the peripheral portion (522);

strikes the fourth region (580) of the lateral side (530) of the light guide (302); and exits the light guide (302) by transmitting through the fourth region (580).

8. The lamp (300) of claim 1, wherein a fifth portion (1000) of the internal beam:

extends directly from the proximal end (510) of the light guide (302) to a central portion (524) of the distal end (520) of the light guide (302); and exits the light guide (302) by transmitting through the central portion (524).

9. The lamp (300) of claim 1, wherein in a cross-section that includes the longitudinal axis (A), the peripheral portion (522) of the distal end (520) of the light guide (302) is convex.

10. The lamp (300) of claim 1, wherein the concave portion (514) includes a flat portion (512) surrounding the longitudinal axis (A).

11. The lamp (300) of claim 1, wherein at least a location (592) on the convex peripheral portion (516) of the proximal end (510) of the light guide (302) is parallel to at least a location (594) on the first region (550) of the lateral side (530) of the light guide (302).

12. The lamp (300) of claim 1, wherein the light guide (302) is rotationally symmetric about the longitudinal axis (A).

13. The lamp (300) of claim 1, further comprising a housing (304) including a transparent portion (306), wherein the light guide (302) is disposed within the transparent portion (306) of the housing (304).

14. The lamp (300) of claim 1, further comprising the at least one light emitting diode (590); wherein the at least one light emitting diode (590) comprises a plurality of light emitting diodes arranged circumferentially around the longitudinal axis (A) and spaced away from the longitudinal axis (A).

15. The lamp (300) of claim 1, wherein the distal end (520) of the light guide (302) and the lateral side (530) of the light guide (302) are devoid of thin-film coatings.

16. The lamp (300) of claim 1, wherein the peripheral portion (522) of the distal end (520) of the light guide (302) is frosted.

17. The lamp (300) of claim 1, wherein in the cross-section that includes the longitudinal axis (A), the lateral side (530) varies smoothly and continuously between convex and concave regions.

18. The lamp (300) of claim 1, wherein in the cross-section that includes the longitudinal axis (A), the lateral side (530) includes only a single convex region.

19. A lamp (300), comprising:

a light guide (302) including a proximal end (510) configured to receive light from at least one light emitting diode (590), the proximal end (510) forming the received light into an internal beam inside the light guide (302), the light guide (302) including a distal end (520), the distal end (520) having a peripheral portion (522) thereon;

the light guide (302) having a longitudinal axis (A) extending from the proximal end (510) to the distal end (520), the light guide (302) including a lateral side (530) extending from a location adjacent the peripheral portion (522) of the distal end (520) to a location adjacent the proximal end (510), wherein the lateral side (530) of the light guide (302) has a first region (550), a second region (560), a third region (570), and a fourth region (580), the first, second, third, and fourth regions extending successively from the proximal end (510) to the distal end (520);

wherein in a cross-section that includes the longitudinal axis (A), the first region (550) is concave, the second region (560) is convex, the fourth region (580) is concave, and the third region (570) includes a smooth and continuous transition between the second region (560) and the fourth region (580); and wherein in a cross-section that includes the longitudinal axis (A), the proximal end (510) of the light guide (302) has a concave portion (514) surrounded by a convex peripheral portion (516).

20. The lamp (300) of claim 19, wherein at least a location (592) on the convex peripheral portion (516) of the proximal end (510) of the light guide (302) is parallel to at least a location (594) on the first region (550) of the lateral side (530) of the light guide (302).

* * * * *